United States Patent
Cave et al.

(10) Patent No.: US 7,590,386 B2
(45) Date of Patent: Sep. 15, 2009

(54) METHOD FOR CONTROL OF CONTENTION-BASED WIRELESS ACCESS

(75) Inventors: Christopher Cave, Candiac (CA); Eldad Zeira, Huntington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 328 days.

(21) Appl. No.: 10/217,126

(22) Filed: Aug. 12, 2002

(65) Prior Publication Data

US 2004/0203426 A1 Oct. 14, 2004

Related U.S. Application Data (60) Provisional application No. 60/373,463, filed on Apr. 18, 2002.

(51) Int. Cl.
*H04B 17/00* (2006.01)
*H04M 1/00* (2006.01)

(52) U.S. Cl. ............ 455/67.11; 455/522; 455/63.1; 455/67.13; 370/252; 370/445; 370/447

(58) Field of Classification Search ......... 455/522, 455/67.11, 63.1, 67.13; 370/252, 445, 447, 370/461, 462
See application file for complete search history.

(56) References Cited

U.S. PATENT DOCUMENTS

| | | | |
|---|---|---|---|
| 5,333,147 A | 7/1994 | Nohara et al. | |
| 5,333,175 A | 7/1994 | Ariyavisitakul et al. | |
| 5,517,522 A | 5/1996 | Arweiler et al. | |
| 5,774,658 A | 6/1998 | Kalkunte et al. | |
| 6,009,553 A | 12/1999 | Martinez et al. | |
| 6,112,080 A | 8/2000 | Anderson et al. | |
| 6,157,616 A | 12/2000 | Whitehead et al. | |
| 6,256,301 B1 | 7/2001 | Tiedemann, Jr. et al. | |
| 6,259,724 B1* | 7/2001 | Esmailzadeh | 375/143 |
| 6,445,686 B1* | 9/2002 | Hoffbeck et al. | 370/318 |
| 6,477,353 B1 | 11/2002 | Honda et al. | |
| 6,597,675 B1 | 7/2003 | Ezmailzadeh et al. | |
| 6,795,689 B1 | 9/2004 | Ogren et al. | |
| 2001/0019541 A1 | 9/2001 | Jou et al. | |
| 2003/0040319 A1 | 2/2003 | Hansen et al. | |
| 2004/0029604 A1 | 2/2004 | Raaf | |

FOREIGN PATENT DOCUMENTS

| | | |
|---|---|---|
| JP | 08-00502 | 1/1996 |
| JP | 08-111886 | 4/1996 |
| JP | 08111886 | 4/1996 |

(Continued)

OTHER PUBLICATIONS

3GPP TS25.331, V4.2.1 (Oct. 2001), RRC Protocol Specification.

(Continued)

*Primary Examiner*—Yuwen Pan
(74) *Attorney, Agent, or Firm*—Volpe and Koenig, P.C.

(57) ABSTRACT

The present invention is a method for controlling access to a contention-based communication channel. Error types of a transmitted communication signal over the communication channel are classified and corresponding parameters of the communication channel are adjusted in response to the classification to control the rate at which individual error types occur.

19 Claims, 4 Drawing Sheets

FOREIGN PATENT DOCUMENTS

| | | |
|---|---|---|
| JP | 08-223110 | 8/1996 |
| JP | 08223110 | 8/1996 |
| JP | 08-265832 | 10/1996 |
| JP | 08265832 | 10/1996 |
| WO | 96/31014 | 10/1996 |
| WO | 98/37647 | 8/1998 |
| WO | 00/22873 | 4/2000 |
| WO | 00/57663 | 9/2000 |
| WO | 01/93462 | 12/2001 |

OTHER PUBLICATIONS

3GPP TS25.430, V4.1.0 (Jun. 2001), UTRAN lub interface: general aspects and principles.
3GPP TS25.331, V4.2.1., "RRC Protocol Specification", Oct. 2001.
3GPP TS25.430. V4.1.0, "UTRAN Lub Interface: General Aspects and Principals", Jun. 2001.
3GPP, "3$^{rd}$ Generation Partnership Project; Technical Specification Group Radio Access Network; RRC Protocol Specification (Release 1999)" 3GPP TS 25.331 v3.10.0 (Mar. 2002).
3GPP, "3$^{rd}$ Generation Partnership Project; Technical Specification Group Radio Access Network; RRC Protocol Specification (Release 1999)," 3GPP TS 25.331 v3.11.0 (Jun. 2002).
3GPP, "3$^{rd}$ Generation Partnership Project; Technical Specification Group Radio Access Network; RRC Protocol Specification (Release 4)," 3GPP TS 25.331 v4.2.1 (Oct. 2001).
3GPP, "3$^{rd}$ Generation Partnership Project; Technical Specification Group Radio Access Network; RRC Protocol Specification (Release 4)," 3GPP TS 25.331 v4.4.0 (Mar. 2002).
3GPP, "3$^{rd}$ Generation Partnership Project; Technical Specification Group Radio Access Network; RRC Protocol Specification (Release 4)," 3GPP TS 25.331 v4.5.0 (Jun. 2002).
3GPP, "3$^{rd}$ Generation Partnership Project; Technical Specification Group Radio Access Network; RRC Protocol Specification (Release 5)," 3GPP TS 25.331 v5.0.0 (Mar. 2002).
3GPP, "3$^{rd}$ Generation Partnership Project; Technical Specification Group Radio Access Network; RRC Protocol Specification (Release 5)," 3GPP TS 25.331 v5.1.0 (Jun. 2002).
3GPP, "3$^{rd}$ Generation Partnership Project; Technical Specification Group Radio Access Network; UTRAN LUB Interface: General Aspects and Principals (Release 1999)," 3GPP TS 25.430 v3.7.0 (Jan. 2002).
3GPP, "3$^{rd}$ Generation Partnership Project; Technical Specification Group Radio Access Network; UTRAN LUB Interface: General Aspects and Principals (Release 1999)," 3GPP TS 25.430 v3.8.0 (Jun. 2002).
3GPP, "3$^{rd}$ Generation Partnership Project; Technical Specification Group Radio Access Network; UTRAN LUB Interface: General Aspects and Principals (Release 4)," 3GPP TS 25.430 v4.1.0. (Jul. 2001).
3GPP, "3$^{rd}$ Generation Partnership Project; Technical Specification Group Radio Access Network; UTRAN LUB Interface: General Aspects and Principals (Release 4)," 3GPP TS 25.430 v4.2.0. (Jan. 2002).
3GPP, "3$^{rd}$ Generation Partnership Project; Technical Specification Group Radio Access Network; UTRAN LUB Interface: General Aspects and Principals (Release 4)," 3GPP TS 25.430 v4.3.0. (Jun. 2002).
3GPP, "3$^{rd}$ Generation Partnership Project; Technical Specification Group Radio Access Network; UTRAN LUB Interface: General Aspects and Principals (Release 5)," 3GPP TS 25.430 v5.0.0. (Mar. 2002).
3GPP, "3$^{rd}$ Generation Partnership Project; Technical Specification Group Radio Access Network; UTRAN LUB Interface: General Aspects and Principals (Release 5)," 3GPP TS 25.430 v5.1.0. (Jun. 2002).
3GPP, "3$^{rd}$ Generation Partnership Project; Technical Specification Group Radio Access Network; RRC Protocol Specification (Release 1999)," 3GPP TS 25.331 v3.10.0 (Mar. 2002).
3GPP, "3$^{rd}$ Generation Partnership Project; Technical Specification Group Radio Access Network; RRC Protocol Specification (Release 1999)," 3GPP TS 25.331 v3.11.0 (Jun. 2002).
3GPP, "3$^{rd}$ Generation Partnership Project; Technical Specification Group Radio Access Network; RRC Protocol Specification (Release 4)," 3GPP TS 25.331 v4.2.1 (Oct. 2001).
3GPP, "3$^{rd}$ Generation Partnership Project; Technical Specification Group Radio Access Network; RRC Protocol Specification (Release 4)," 3GPP TS 25.331 v4.4.0 (Mar. 2002).
3GPP, "3$^{rd}$ Generation Partnership Project; Technical Specification Group Radio Access Network; RRC Protocol Specification (Release 4)," 3GPP TS 25.331 v4.5.0 (Jun. 2002).
3GPP, "3$^{rd}$ Generation Partnership Project; Technical Specification Group Radio Access Network; RRC Protocol Specification (Release 5)," 3GPP TS 25.331 v5.0.0 (Mar. 2002).
3GPP, "3$^{rd}$ Generation Partnership Project; Technical Specification Group Radio Access Network; RRC Protocol Specification (Release 5)," 3GPP TS 25.331 v5.1.0 (Jun. 2002).
3GPP, "3$^{rd}$ Generation Partnership Project; Technical Specification Group Radio Access Network; UTRAN LUB Interface: General Aspects and Principals (Release 1999)," 3GPP TS 25.430 v3.7.0 (Jan. 2002).

3GPP, "3rd Generation Partnership Project; Technical Specification Group Radio Access Network; UTRAN LUB Interface: General Aspects and Principals (Release 1999)," 3GPP TS 25.430 v3.8.0 (Jun. 2002).

3GPP, "3rd Generation Partnership Project; Technical Specification Group Radio Access Network; UTRAN LUB Interface: General Aspects and Principals (Release 4)," 3GPP TS 25.430 v4.1.0 (Jul. 2001).

3GPP, "3rd Generation Partnership Project; Technical Specification Group Radio Access Network; UTRAN LUB Interface: General Aspects and Principals (Release 4)," 3GPP TS 25.430 v4.2.0 (Jan. 2002).

3GPP, "3rd Generation Partnership Project; Technical Specification Group Radio Access Network; UTRAN LUB Interface: General Aspects and Principals (Release 4)," 3GPP TS 25.430 v4.3.0 (Jun. 2002).

3GPP, "3rd Generation Partnership Project; Technical Specification Group Radio Access Network; UTRAN LUB Interface: General Aspects and Principals (Release 5)," 3GPP TS 25.430 v5.0.0 (Mar. 2002).

3GPP, "3rd Generation Partnership Project; Technical Specification Group Radio Access Network; UTRAN LUB Interface: General Aspects and Principals (Release 5)," 3GPP TS 25.430 v5.10 (Jun. 2002).

* cited by examiner

FIG. 3   (ERROR CLASSIFICATION STEPS)

FIG. 4

(PARAMETER CONTROL STEPS)

METHOD FOR CONTROL OF CONTENTION-BASED WIRELESS ACCESS

CROSS REFERENCE TO RELATED APPLICATIONS

This application claims priority from U.S. Provisional Application No. 60/373,463, filed on Apr. 18, 2002, the entirety of which is hereby incorporated by reference.

BACKGROUND OF THE INVENTION

The present invention relates to wireless communication systems. More specifically, the present invention relates to the control of contention-based wireless access in communication systems.

Figure 1:
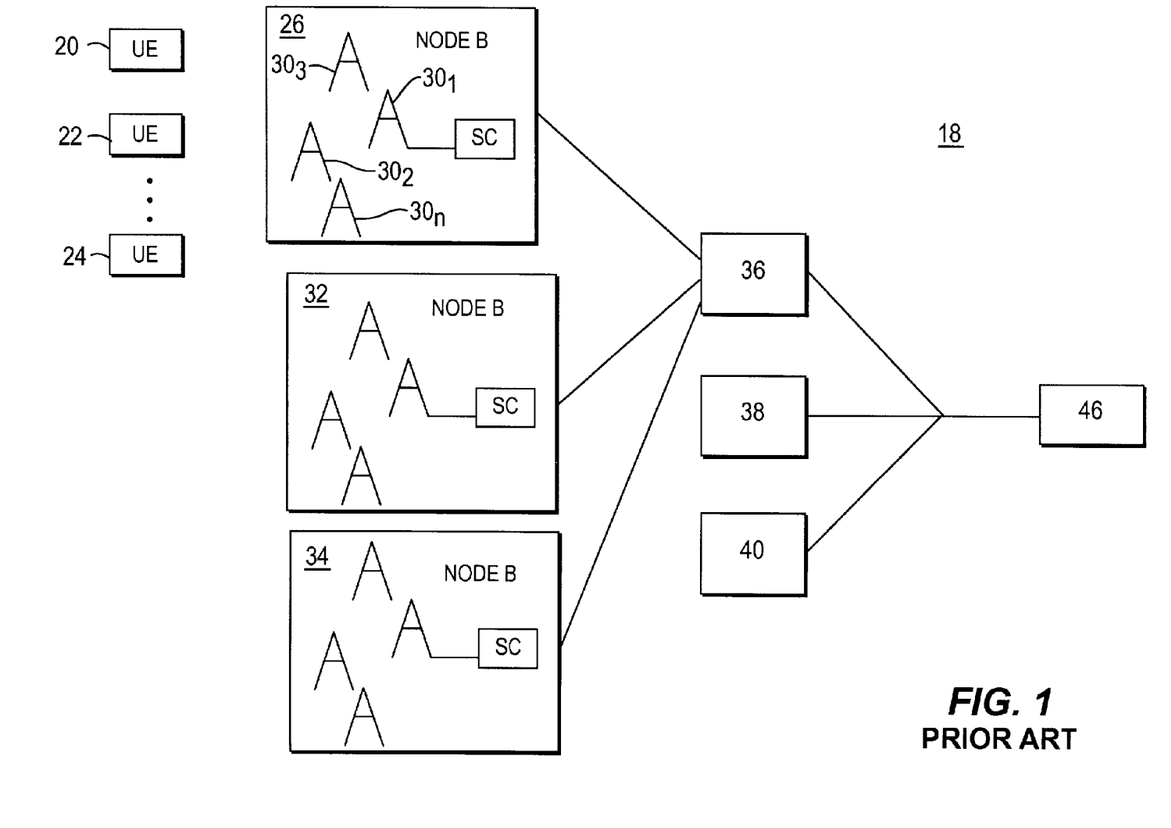
FIG. 1 is a diagram of a prior art simplified wireless spread spectrum code division multiple access (CDMA) of time division duplex (TDD) or frequency division duplex (FDD) communication system.

FIG. 1 illustrates a simplified wireless spread spectrum code division multiple access (CDMA) or time division duplex (TDD) or frequency division duplex (FDD) communication system 18. The system 18 comprises a plurality of Node Bs 26, 32, 34, a plurality of radio network controllers (RNCs) 36, 38, 40, a plurality of UEs 20, 22, 24 and a core network 46. The plurality of Node Bs are connected to the plurality of RNCs 36, 38, 40, which are, in turn, connected to the core network 46. Each Node B 26, 32, 34 communicates with its associated user equipment (UE) 20, 22, 24. Data signals are communicated between UEs and the Node B over the same spread spectrum. Each data signal in the shared spectrum is spread with a unique chip code sequence. Upon reception, using a replica of the chip code sequence, a particular data signal is recovered.

In the context of a CDMA system, signals are distinguished by their chip code sequences (codes) and separate communication channels are created using different codes. Signals from the Node B to the UEs are sent on downlink channels and signals from the UEs to the Node B are sent on uplink channels.

In many CDMA systems, a random access channel (RACH) is used for some uplink communications. A RACH is capable of carrying packets of data from multiple UEs. Each packet is distinguishable by a combination of time slot and code. For detection by the Node B, the packets have a sequence which also distinguishes it from other packets. The RACH is a contention-based uplink transport channel which may carry control information from the UE to set up an initial connection with the Node B, for example, to register the UE after power-on to the network or to perform location updates or to initiate a call. Transmissions are sent using repeating frames, each having a plurality of time slots, such as fifteen time slots with only one or two time slots per frame typically dedicated to RACH. When a packet is transmitted over the RACH, it may last for multiple frames. Those frames however, are not necessarily consecutive because a back-off process must be performed between each transmission to control the rate at which UEs access the RACH.

A UE may attempt a RACH transmission and select a time slot using one of N code identifiers, for example in a TDD CDMA system, one of eight midambles. If no other UE transmits in the same slot with the same midamble and if there is sufficient transmission power, then the UE's RACH transmission succeeds. If another UE transmits in the same slot with the same midamble, then they both fail. This transmission error is known as a collision error. Generally, whenever two or more UEs transmit using the same channel in a wireless system, a collision occurs. Another type of transmission error results when there is insufficient transmission power.

The necessary power is generally a function of the channel, the interference, and other PRACH transmissions in the same slot.

In some communication systems, such as with a 3GPP system, there is a relatively long delay, on the order of seconds, before which a UE realizes a transmission error has occurred and decides to retransmit the failed packet. The recommended operating condition for the RACH is therefore preferably biased toward having very few collisions or insufficient transmission power errors. The failed packet may be retransmitted on data link layer 2 (L2) or data link layer 3 (L3) depending on the mode of operation.

The radio access network has no prior information regarding which RACH codes, or more generally which channels were transmitted. The detection of transmitted transport block sets (TBS) or bursts is performed at the receiver, where the number of UEs that transmitted using the detected code is unknown. In the event of a RACH transmission error, the cause remains unidentified. The error might be the result of a code collision or insufficient transmission power.

A parameter of dynamic persistence (DP) is defined which is set by the RNC to avoid saturation of the RACH. The DP level (DPL) is broadcast from the Node B to the UEs and the UEs adjust their rate of access to the RACH time slots as a function of DP. A RACH constant value (CV) parameter is defined which is managed at the RNC and is used by the UEs to determine the power of RACH transmissions.

In current systems, the DP parameter, RACH CV parameter, and other parameters are set and adjusted in order to avoid collisions and insufficient transmission power errors or, in the alternative, to maintain a predetermined target collision error and target insufficient transmission power error probability. The DP parameter is generated at the Node B and the RACH CV is generated at the RNC.

A prior art method of controlling these parameters utilizes the number of successful and failed UE transmissions in a time slot for individual system frames. Another prior art method broadcasts these parameters to the UEs, which then adjust their uplink transmission accordingly. It is difficult, however, to appropriately control these parameters because they are separately generated at the Node B and RNC and because the cause of the transmission error remains unknown.

Accordingly, there exists a need for an improved method of controlling parameters in a contention-based channel wherein the cause of transmission errors is identified and the rate at which such errors occur is identified and controlled by adjusting parameters at the Node B.

SUMMARY

The present invention is a method of controlling access for any type of contention-based communication channel, such as for example a Time Division Multiple Access (TDMA) system, where a DPL is broadcast to mobiles that controls the rate at which the channel is accessed, and where a method is available for controlling transmission power. Error types of a communication signal transmitted over a communication channel are classified and corresponding parameters of the communication channel are adjusted in response to the classification to maintain a predetermined level of errors.

DETAILED DESCRIPTION OF THE PREFERRED EMBODIMENT(S)

The present invention will be described with reference to the drawing figures where like numerals represent like elements throughout.

Figure 2:
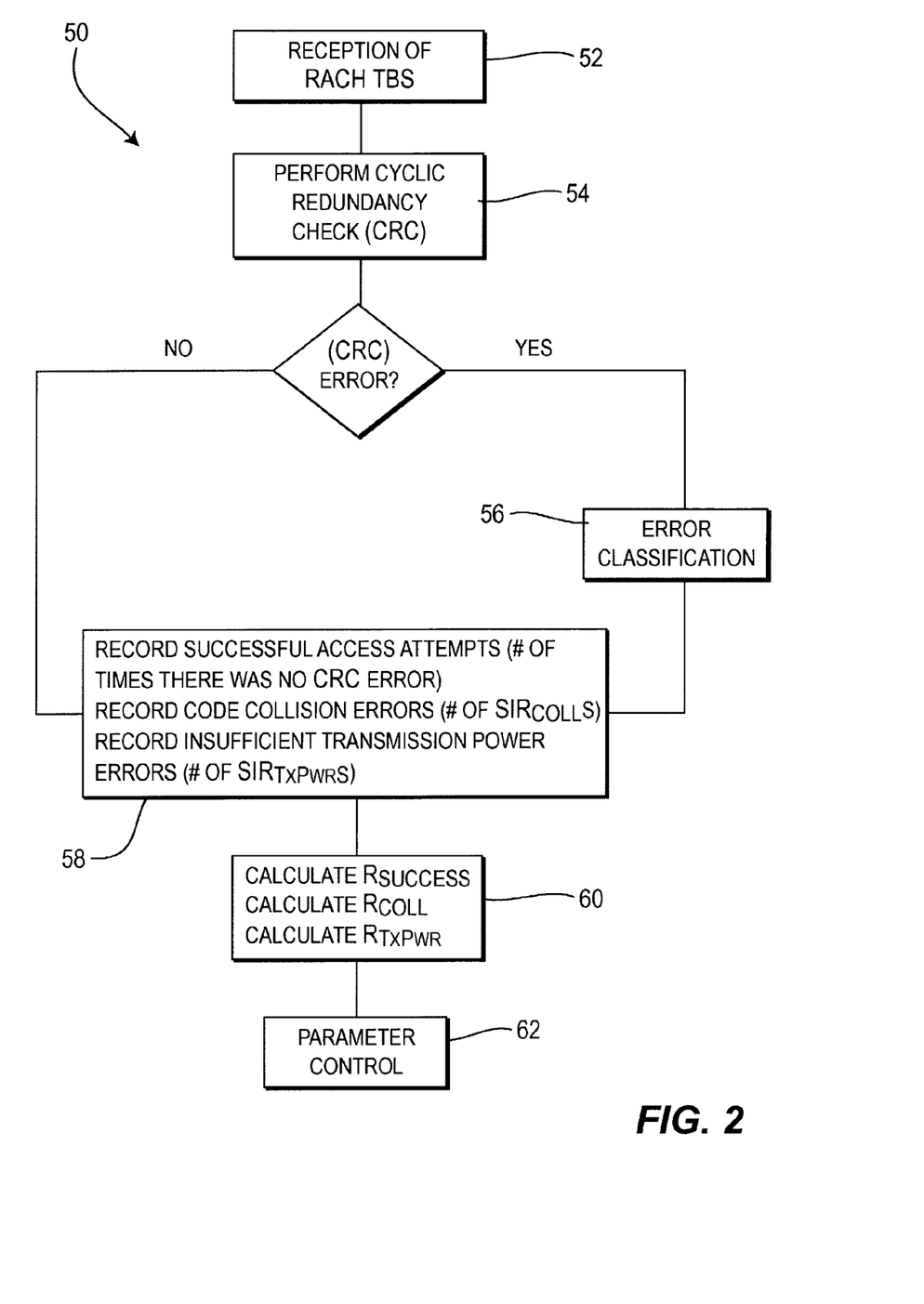
FIG. 2 is a flow diagram of a control process for a contention-based wireless access system in accordance with the preferred embodiment of the present invention.

The control process 50 of the present invention is shown in FIG. 2. The purpose of the control process 50 is to maintain satisfactory delay and throughput characteristics for uplink transmission over a random access channel (RACH) or a physical random access channel (PRACH). This is achieved by ensuring that the number of transmission errors due to channelization code collisions and insufficient transmission power remain at an acceptable level. The process 50 separately addresses the causes of code collisions and insufficient transmission power. The cause and frequency of transmission errors are determined so that an appropriate parameter may be adjusted, if necessary, to ensure the rate of errors falls within a predetermined range.

The process 50 commences with the reception of a RACH transport block set (TBS) (step 52). The detection of transmitted codes is performed at the Node B receiver by means of midamble detection and code lookup. For each RACH TBS that is received, a cyclic redundancy check (CRC) is performed (step 54). It should be noted that while a CRC is preferred, any other method for detecting transmissions errors may be used. The CRC is preferably performed at the Node B. If there is no CRC error, the received RACH TBS is recorded as a successful access attempt (step 58). If, on the other hand, there is an error, the type of error is classified in step 56 and then recorded at step 58.

Figure 3:
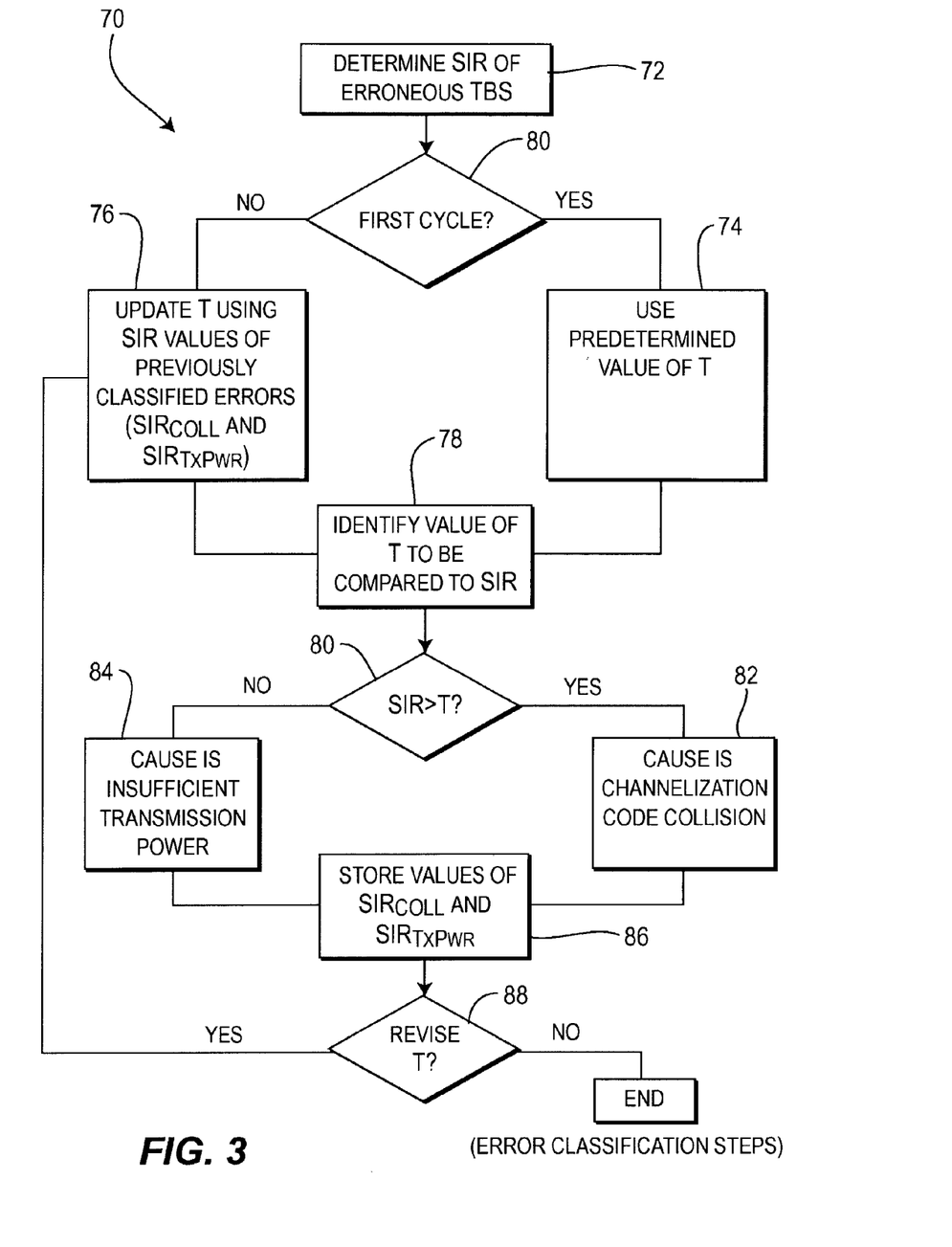
FIG. 3 is a flow diagram of a RACH error classification process in accordance with the preferred embodiment of the present invention.

The process carried out during step 56 for classifying the type of error that has occurred is shown in FIG. 3 and indicated generally with reference numeral 70. The first step 72 is to determine a signal-to-interference ratio (SIR) of an erroneous TBS. Preferably, the SIR is compared to a dynamic threshold value, T, to identify the cause of a transmission error as described below. It should be noted, however, that received signal code power (RSCP) may be used instead of the SIR in process 56.

If it is the first time the error classification process is being performed, a predetermined value of T is used (step 74). For subsequent cycles, the value of T is updated every N frames using SIR values of previously classified errors (step 76). The value of N may also be adjusted to account for the level of traffic on the PRACH. The value of T is identified in step 78 and compared to the SIR in step 80. If the SIR is greater than T, the cause of the transmission error is determined to be code collision (step 82). If the SIR is less than or equal to T, the cause of the transmission error is determined to be insufficient transmission power (step 84). SIRs having values greater than T and therefore corresponding to code collision errors are, for convenience purposes, designated $SIR_{COLL}$. Similarly, SIRs having values less than or equal to T and therefore corresponding to insufficient transmission power errors are, again for convenience, designated $SIR_{TxPwr}$. The SIR value of each error is stored in step 86 according to error type.

As briefly mentioned above, the value of T is updated using the SIR values ($SIR_{COLL}$ and $SIR_{TxPwr}$) of previously classified errors. The previously calculated values of T stored at step 86 are transmitted as needed at step 88 to update T at step 76. Specifically, T is updated at step 76 according to:

$$T = \mathrm{mean}(SIR_{TxPwr}) + \frac{\mathrm{mean}(SIRTxPwr) - \mathrm{mean}(SIR_{COLL})}{\frac{\sigma_{COLL}}{\sigma_{TxPwr}} + 1}, \quad \text{Equation (1)}$$

where $\sigma_{COLL}$ and $\sigma_{TxPwr}$ represent respectively the standard deviation of $SIR_{COLL}$ and $SIR_{TxPwr}$. The updated threshold corresponds to the midpoint between the mean of the SIR values stored for both $SIR_{COLL}$ and $SIR_{TxPwr}$, weighted by their variances.

Referring again to FIG. 2, the SIR values calculated during step 56 (error classification) are used in step 58 to record the number of RACH opportunities where failed access attempts occurred because of insufficient transmission power and because of code collision. These statistics, in addition to the number of successful attempts, are gathered over N frames as desired so that the following is known:

The number of RACH access opportunities where successful access attempts occurred, i.e. the number of access opportunities where there was no CRC error.

The number of RACH access opportunities where failed access attempts occurred because of a PRACH code collision, i.e. the number of $SIR_{COLL}$s that occurred in step 56.

The number of RACH access opportunities where failed access attempts occurred because of insufficient transmission power, i.e. the number of $SIR_{TxPwr}$s that occurred in step 56.

The information in step 58 is compiled over a window of N frames and used in step 60 to calculate the following statistics:

$R_{SUCCESS}$ which is the rate of successful access attempts per access opportunity, measured over N frames;

$R_{COLL}$ which is the rate of failed access opportunities per access opportunity due to PRACH code collisions, measured over N frames; and $R_{TxPwr}$ which is the rate of failed access opportunities per access opportunity due to insufficient transmission power, measured over N frames.

Figure 4:
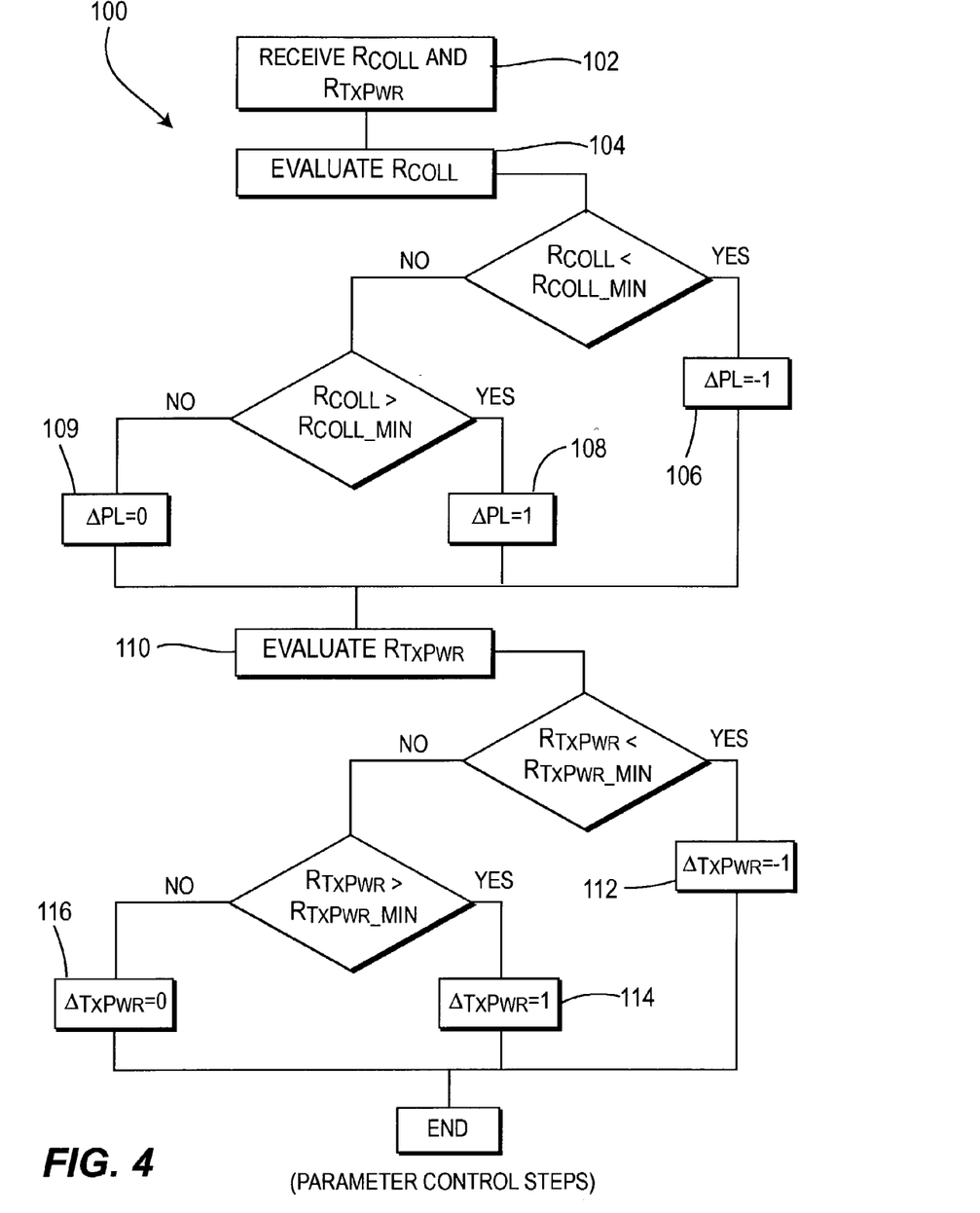
FIG. 4 is a flow diagram of a RACH parameter control process in accordance with the preferred embodiment of the present invention.

In step 62, appropriate parameters are adjusted as necessary to ensure $R_{COLL}$ and $R_{TxPwr}$ remain within acceptable levels. The process carried out during step 62 for maintaining acceptable levels of collision and power errors is shown in FIG. 4 and indicated with reference numeral 100. In general, the process 100 evaluates the values of $R_{COLL}$ and $R_{TxPwr}$ with respect to a predetermined range and, if necessary, adjusts parameters capable of controlling $R_{COLL}$ and $R_{TxPwr}$ to maintain an acceptable rate of errors.

More specifically, upon reception of $R_{COLL}$ and $R_{TxPwr}$ (step 102), $R_{COLL}$ is evaluated (step 104). If $R_{COLL}$ is less than a predetermined minimum value, $R_{COLL\_min}$, a parameter capable of controlling $R_{COLL}$ is decreased preferably by 1, thereby permitting $R_{COLL}$ to increase (step 106). If $R_{COLL}$ is greater than a predetermined maximum value, $R_{COLL\_max}$, the same parameter is increased preferably by 1, thereby causing $R_{COLL}$ to decrease (step 108). If $R_{COLL}$ is within $R_{COLL\_min}$ and $R_{COLL\_max}$, the parameter remains unchanged (step 109).

The preferred parameter for controlling $R_{COLL}$ is DPL and the DPL is preferably controlled at Node B. Current UTRAN architecture allows the Node B to generate the contents of certain system information blocks (SIBs) such as SIB 7 which generates the DPL making it possible to control the DPL and therefore $R_{COLL}$ at Node B. The DPL is updated following every execution of the process according to:

$$PL=\min(\max(PL+\Delta_{PL}, PL_{MIN}), PL_{MAX}), \quad \text{Equation (2)}$$

where PL represents the persistence level, $\Delta_{PL}$ represents the change in persistence level, and $PL_{MIN}$ and $PL_{MAX}$ represent the minimum and maximum values of PL, respectively.

Referring again to FIG. 4, the next step 110 is to evaluate $R_{TxPwr}$. If $R_{TxPwr}$ is less than a predetermined value, $R_{TxPwr\_min}$, a parameter capable of controlling $R_{TxPwr}$ is decreased preferably by 1, thereby permitting $R_{TxPwr}$ to increase (step 112). If $R_{TxPwr}$ is greater than a predetermined maximum value, $R_{TxPwr\_max}$, the same parameter is increased preferably by 1, thereby causing $R_{TxPwr}$ to decrease (step 114). If $R_{TxPwr}$ is between $R_{TxPwr\_min}$ and $R_{TxPwr\_max}$, the parameter remains unchanged (step 116).

The preferred parameter for controlling $R_{TxPwr}$ is a power offset which allows UE transmission power to be controlled at the Node B along with the DPL. An IBTS parameter corresponds to the IE "individual time slot interference" that is broadcast at the Node B in SIB 14. Conventionally, the value of the IE "individual time slot interference" should correspond to the Interference Signal Code Power (ISCP) per time slot measured at the Node B receiver. Assuming that RACH timeslots are dedicated for RACH transmission only, however, a power offset can be added as follows, $$\text{IBTS=ISCP+Power Offset,} \quad \text{Equation (3)}$$

so that the power offset determines the increase or reduction in transmission power and corresponding $R_{TxPwr}$. Controlling UE transmission power by adding a power offset to the ISCP which represents the IE allows mobiles to be fooled into increasing or decreasing their transmission power by trying to overcome a level of interference that is different from the level of interference that is measured at the Node B. Again, this allows $R_{TxPwr}$ to be adjusted by adjusting the power offset. The primary advantage of controlling UE transmission power through SIB 14 is that it can be performed at the Node B along with the DPL. A secondary advantage of using the power offset is that changes in UE transmission power can be updated more rapidly because they are being managed at the Node B and not the RNC. As a result, the system can react more rapidly to required changes in UE transmission power.

The power offset is updated according to:

$$TxPwr=\min(\max(TxPwr+\Delta_{TxPwr}, TxPwr_{MIN}), TxPwr_{MAX}), \quad \text{Equation (4)}$$

where TxPwr represents transmission power level, $\Delta_{TxPwr}$ represents the change in transmission power level, and $TxPwr_{MIN}$ and $TxPwr_{MAX}$ represent the minimum and maximum values of TxPwr, respectively.

The parameter control process 100 gathers RACH statistics over N frames, at which point updated RACH parameters are suggested. Outputs of the process 100, which as explained above, are the updated DPL and the updated power offset, are provided every N frames. The parameter control process 100 execution period, N, typically lies in a range of 25 to 100 frames. The choice of window size has a large impact on the performance of the process. Since the process 100 is executed every N frames, N should be small enough such that the process 100 promptly responds to rapid changes in RACH load. On the other hand, N should be large enough such that RACH statistics are well averaged. Sporadic behavior in RACH statistics is detrimental when comparing to theoretical statistics.

Referring to again to FIG. 3, although a preferred method for updating T is described in connection with Equation 1, it is important to note that T may updated in a variety of ways. Additional examples of how T may be updated include the following. First, the threshold may be updated following the reception of an error-free RACH burst. If the SIR or RSP of the error-free burst is below the threshold T, the threshold is reduced by $\Delta_1$. If the SIR or RSP of the error-free burst is above the threshold T, the threshold is increased by $\Delta_2$. The threshold increment, $\Delta_1$, and decrement, $\Delta_2$, could be either fixed, change with time or change with other conditions. For example, the threshold could be a function of the difference between the measured SIR and the threshold, T.

Additionally, it is possible to consider the number of codes that were transmitted in the RACH time slot when determining the cause of a transmission error. As the number of received codes increases, the required SNR for successful detection should increase. Different thresholds could be established for different numbers of transmitted codes. Furthermore, a correction factor may be added to the threshold T that depends on the number of transmitted codes within the time slot.

Finally, in systems that employ open loop power control for transmission over a RACH, it is proposed to consider power control parameters when determining the comparison threshold, T. For example, consider the UTRA TDD system whose power control equation for RACH is shown in equation 3. The computation of UE transmission power involves an IBTS term, which is based on the ISCP measured when SIB 14 was last acquired. It is highly possible that the ISCP measurement of the current time slot differs from the ISCP measurement that was used to generate the IE "individual time slot interference." The current time slot ISCP may be used in conjunction with the measured ISCP that was used to generate the IE "individual time slot interference." The SIR measurements for both erroneous and error-free RACH burst may also be normalized by the difference between the two ISCP measurements.

Although the present invention has been described in detail, it is to be understood that the invention is not limited thereto, and that various changes can be made therein without departing from the spirit and scope of the invention, which is defined by the attached claims.

What is claimed is:

1. A method for controlling access to a contention-based communication channel, the method comprising:
   receiving a communication signal transmitted over the contention based communication channel;
   performing an error detection test to determine whether a transmission error has occurred;
   determining a threshold value based on averages of previous signal-to-interference ratio (SIR) determinations;
   classifying transmission errors according to error type using a threshold test, the threshold test including comparing a SIR to the threshold value;
   determining an occurrence rate of each error type, including insufficient transmission power errors; and
   maintaining an error occurrence rate for each error type, wherein an insufficient transmission power error occurrence rate is maintained by adjusting a transmission power parameter by a value equal to a sum of a power offset and interference signal code power (ISCP).

2. The method of claim 1 wherein the error detection test is a cyclic redundancy check.

3. The method of claim 1 wherein the threshold test compares a signal-to-interference ratio to a dynamic threshold value.

4. The method of claim 3 wherein the dynamic threshold value is updated using signal-to-interface ratio values of previously classified errors.

5. The method of claim 1 wherein the threshold test compares received signal code power to a dynamic threshold value.

6. The method of claim 1 wherein determining an occurrence rate of each error type includes determining a collision error occurrence rate.

7. The method of claim 6 wherein collision error occurrence rate is maintained by adjusting at least one parameter of the communication channel.

8. The method of claim 7 wherein a dynamic persistence level parameter is adjusted to control the collision error occurrence rate.

9. The method of claim 1 wherein the interference signal code power corresponds to a value of individual time slot interference.

10. The method of claim 1 further comprising:
transmitting a power control signal to adjust the power of at least one wireless transmit/receive units (WTRUs).

11. A Node B configured to control access to a contention-based communication channel, the Node B comprising:
a receiver configured to receive a communication signal over the communication channel; and
a processor configured to:
perform an error detection test to identify whether a transmission error has occurred,
determine a threshold value based on averages of previous signal-interference ratio (SIR) determinations.
classify identified errors according to error type using a threshold test, the threshold test including comparing a SIR to the threshold value,
determine an occurrence rate of each error type, including insufficient transmission power errors, and
maintain a predetermined an error occurrence rate for each error type, wherein an insufficient transmission power error occurrence rate is maintained by adjusting a transmission power parameter by a value equal to a sum of a power offset and interference signal code power (ISCP).

12. The Node B of claim 11 further comprising:
a transmitter configured to transmit a power control signal to adjust the power of at least one wireless transmit/receive units (WTRUs).

13. The Node B of claim 11 wherein the error detection test is a cyclic redundancy check.

14. The Node B of claim 11 wherein the threshold test compares a signal-to-interference ratio to a dynamic threshold value.

15. The Node B of claim 11 wherein the threshold test compares received signal code power to a dynamic threshold value.

16. The Node B of claim 11 wherein the processor is further configured to determine a collision error occurrence rate.

17. The Node B of claim 11 wherein a collision error occurrence rate is maintained by adjusting at least one parameter of the communication channel.

18. The Node B of claim 11 wherein the interference signals code power corresponds to a value of individual timeslot interference.

19. The Node B of claim 17 wherein a dynamic persistence level parameter is adjusted to control the collision error occurrence rate.

\* \* \* \* \*

UNITED STATES PATENT AND TRADEMARK OFFICE
CERTIFICATE OF CORRECTION

PATENT NO. : 7,590,386 B2  Page 1 of 1
APPLICATION NO. : 10/217126
DATED : September 15, 2009
INVENTOR(S) : Cave et al.

It is certified that error appears in the above-identified patent and that said Letters Patent is hereby corrected as shown below:

IN THE SPECIFICATION

At column 2, lines 21 & 22, after "(DP)" delete "is defined which is set" and insert therefor --which is defined and set--.

At column 2, lines 25 & 26, after the word "parameter", delete "is defined which is managed" and insert therefor --which is defined and managed--.

At column 3, line 28, before the words "the rate" insert --that--.

At column 4, delete "Equation (1)" and insert therefor
--
$$T = mean(SIR_{TxPwr}) + \frac{mean(SIR_{TxPwr}) - mean(SIR_{COLL})}{\frac{\sigma_{COLL}}{\sigma_{TxPwr}} + 1},$$
--.

At column 6, line 6, after the word "may" insert --be--.

IN THE CLAIMS

At claim 10, column 7, line 25, after the words "transmit/receive" delete "units (WTRUs)." and insert therefor --unit (WTRU).--.

At claim 11, column 8, line 6, after the word "predetermined" delete "an".

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,590,386 B2 Page 1 of 1
APPLICATION NO. : 10/217126
DATED : September 15, 2009
INVENTOR(S) : Cave et al.

It is certified that error appears in the above-identified patent and that said Letters Patent is hereby corrected as shown below:

IN THE CLAIMS

At claim 11, column 8, line 6, delete "maintain a predetermined error occurrence rate", and insert therefore --maintain an error occurrence rate--.

Signed and Sealed this

Twenty-second Day of June, 2010

David J. Kappos
*Director of the United States Patent and Trademark Office*

UNITED STATES PATENT AND TRADEMARK OFFICE
CERTIFICATE OF CORRECTION

PATENT NO.       : 7,590,386 B2                              Page 1 of 1
APPLICATION NO.  : 10/217126
DATED            : September 15, 2009
INVENTOR(S)      : Cave et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Twenty-first Day of September, 2010

David J. Kappos
*Director of the United States Patent and Trademark Office*